United States Patent
Park (10) Patent No.: US 11,171,805 B2
(45) Date of Patent: Nov. 9, 2021

(54) CAN COMMUNICATION METHOD BETWEEN ESS BATTERY AND POWER MANAGEMENT DEVICE

(71) Applicant: LG CHEM, LTD., Seoul (KR)

(72) Inventor: Mi So Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/755,523

(22) PCT Filed: Aug. 9, 2018

(86) PCT No.: PCT/KR2018/009074
§ 371 (c)(1),
(2) Date: Apr. 10, 2020

(87) PCT Pub. No.: WO2019/088413
PCT Pub. Date: May 9, 2019

(65) Prior Publication Data
US 2021/0194722 A1  Jun. 24, 2021

(30) Foreign Application Priority Data
Nov. 1, 2017 (KR) .......................... 10-2017-0144789

(51) Int. Cl.
*H04L 12/40* (2006.01)
(52) U.S. Cl.
CPC .................. *H04L 12/40045* (2013.01); *H04L 12/40013* (2013.01); *H04L 2012/40215* (2013.01)
(58) Field of Classification Search
CPC ......... H04L 12/40045; H04L 12/40013; H04L 2012/40215
See application file for complete search history.

(56) References Cited

U.S. PATENT DOCUMENTS

| | | | | |
|---|---|---|---|---|
| 5,854,454 A | * | 12/1998 | Upender | ............. H04L 12/4135 187/247 |
| 6,363,083 B1 | * | 3/2002 | Spielbauer | .......... H04L 61/6004 370/470 |
| 2004/0042401 A1 | | 3/2004 | Itoi | |
| 2004/0057450 A1 | | 3/2004 | Okuyama | |

(Continued)

FOREIGN PATENT DOCUMENTS

| | | |
|---|---|---|
| CN | 106160054 A | 11/2016 |
| EP | 2 892 200 A1 | 7/2015 |

(Continued)

OTHER PUBLICATIONS

Extended European Search Report dated Apr. 17, 2020 for European Patent Application No. 18873361.2.

(Continued)

*Primary Examiner* — Henry Tsai
*Assistant Examiner* — Christopher A Daley
(74) *Attorney, Agent, or Firm* — Birch, Stewart, Kolasch & Birch, LLP (57) ABSTRACT

Generating a CAN ID represented by a predetermined bit used in CAN communication, including a first bit allocation process for allocating N-th to M-th bits of the CAN ID for use classification, a second bit allocation process for allocating O-th to P-th bits of the CAN ID for target classification, and a third bit allocation process for allocating Q-th to R-th bits of the CAN ID for data number classification (N, M, O, P, Q and R are integers and satisfy a relation of R>Q, P>O, M>N, N>P, O>R).

10 Claims, 5 Drawing Sheets

(56) References Cited

U.S. PATENT DOCUMENTS

| | | | |
|---|---|---|---|
| 2011/0208884 A1 | 8/2011 | Horihata | |
| 2012/0320927 A1 | 12/2012 | Katou et al. | |
| 2014/0036693 A1* | 2/2014 | Mabuchi | H04L 43/0817 |
| | | | 370/243 |
| 2015/0208365 A1* | 7/2015 | Son | H04W 52/281 |
| | | | 455/522 |
| 2016/0234037 A1* | 8/2016 | Mabuchi | H04L 12/40182 |
| 2017/0093659 A1* | 3/2017 | Elend | H04L 43/08 |
| 2017/0126711 A1 | 5/2017 | Jung et al. | |
| 2017/0237707 A1 | 8/2017 | Jo | |
| 2018/0144119 A1* | 5/2018 | Kishikawa | H04L 63/1416 |
| 2020/0177409 A1* | 6/2020 | Galchenko | H04L 12/283 |

FOREIGN PATENT DOCUMENTS

| | | |
|---|---|---|
| JP | 5454517 B2 | 11/2016 |
| KR | 2003-0010890 A | 2/2003 |
| KR | 10-2004-0024078 A | 3/2004 |
| KR | 10-2007-0117264 A | 12/2007 |
| KR | 10-2011-0107724 A | 10/2011 |
| KR | 10-2012-0067244 A | 6/2012 |
| KR | 10-2014-0076692 A | 6/2014 |
| KR | 10-1601303 B1 | 3/2016 |
| KR | 10-1649790 B1 | 8/2016 |
| KR | 10-1714770 B1 | 3/2017 |
| WO | WO 00/56010 A2 | 9/2000 |

OTHER PUBLICATIONS

International Search Report for PCT/KR2018/009074 (PCT/ISA/210) dated Oct. 22, 2018.

* cited by examiner

CAN COMMUNICATION METHOD BETWEEN ESS BATTERY AND POWER MANAGEMENT DEVICE

TECHNICAL FIELD

The present invention relates to a CAN communication method between an ESS battery and a power management device. The present invention relates to a CAN communication method between an ESS battery and a power management device, in which a can ID is separately used.

BACKGROUND ART

Figure 1:
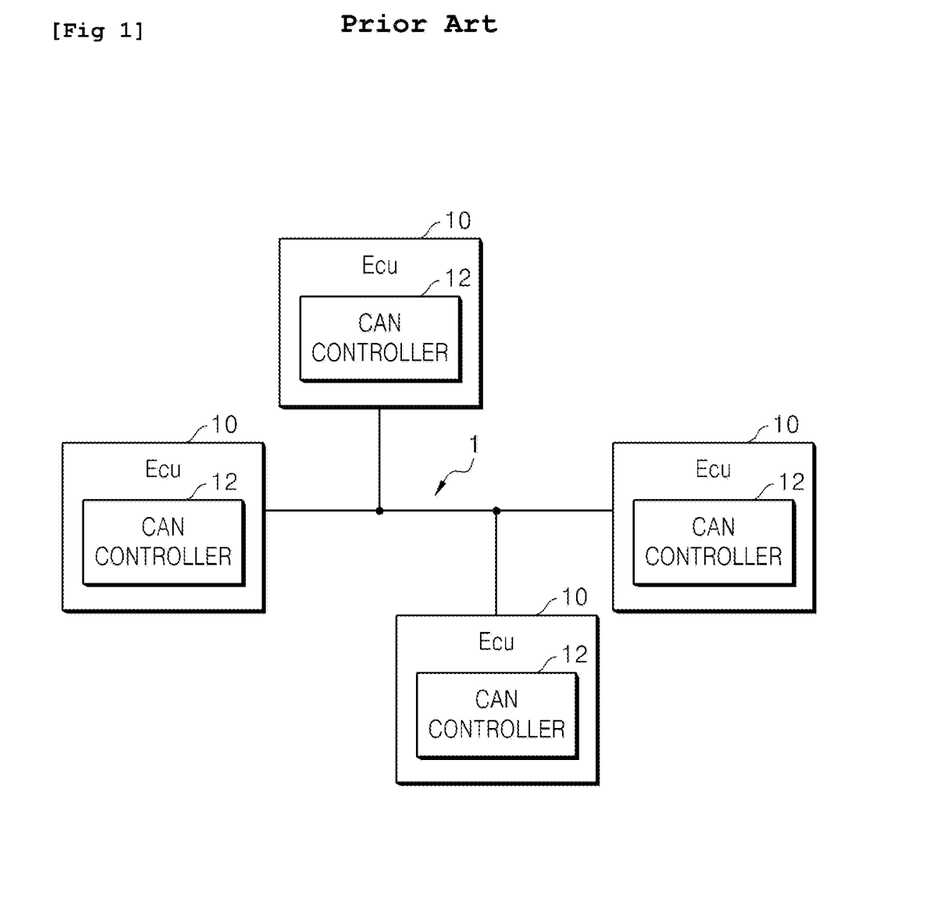
FIG. 1 is a diagram for explaining a general CAN communication.

Generally, as shown in FIG. 1, a Controller Area Network (CAN) is a communication method in which a plurality of ECUs 10 are connected in parallel to a CAN bus 1 to transmit and receive CAN messages between the ECUs 10.

That is, each ECU 10 shares a large amount of information in a manner that CAN messages are continuously transmitted to the other ECUs 10, and the CAN messages transmitted from the other ECUs 10 are received and processed according to the priority order Here, in order that each ECU 10 is connected to the CAN bus 1 and is set as a CAN node capable of sending and receiving CAN messages, each ECU 10 must be connected to the CAN bus 1 via the CAN controller 12.

At this time, the CAN controller 12 may deliver only the CAN message, which has a plurality of ID values and ID mask values and is determined according to a combination thereof, to the other ECU 10 connected to each of the CAN bus 1 via the CAN controller 12.

In other words, CAN communication is capable of real-time message communication, processing information according to the priority, and filtering and receiving only messages corresponding to the set ID value.

But, in this CAN communication, since each power management device has a different communication protocol between the battery and the power device, there is a problem in that a communication protocol has to be developed for each power management device.

Accordingly, the present invention proposes a standardized communication protocol for performing CAN communication between a battery and a power management device.

DISCLOSURE

Technical Problem

The present invention provides a standardized communication protocol method for performing CAN communication.

More specifically, the present invention provides a method for standardizing the ID of CAN communication by allocating an area for each CAN communication ID.

Technical Solution

In a CAN communication method using a CAN ID represented by a predetermined bit, the method may comprise generating the CAN ID represented by the predetermined bit through a first bit allocation process of allocating ID 8 to ID 10 bits of the CAN ID for use classification, a second bit allocation process of allocating ID 4 to ID 7 bits of the CAN ID for target classification, and a third bit allocation process of allocating ID 0 to ID 3 bits of the CAN ID for data number classification.

Meanwhile, the first bit allocation process may be configured to include a use classification bit area division step for dividing 3 bits (ID 8 to ID 10) allocated for use classification into two or more areas having a predetermined range and an application assignment step for assigning a use corresponding to each of the two or more areas having the predetermined range divided in the use classification bit area division step.

On the other hand, the use assigned in the application assignment step may be assigned according to the data transmission frequency or may be assigned according to the area where data is transmitted and received.

For example, the use assigned according to the transmission frequency may be set as at least one of a periodic data transmission use and a one-time data transmission use. And a use assigned according to a range of an area where data is transmitted and received may be set as at least one of an external data communication use transmitted to and received from a battery system and a power management device; and an internal data communication use transmitted and received within a battery system.

Meanwhile, the data to be transmitted in the periodic data transmission use may include at least one of general data of the power management device, general data of the battery system, and general data of individual batteries, and the data to be transmitted in the one-time-use data transmission use may include at least one of interruption data for interrupting the operation of the battery, mode change data for changing the mode of the battery, battery information data including at least one of temperature, voltage, and current of the battery cell, balancing data between battery cells, version or type data of individual batteries, and version or type data of the battery system.

Meanwhile, the use assigned in the application assignment step may be set as a data communication use transmitted/received between the battery system and the power management device or a data communication use transmitted/received in the battery system.

Meanwhile, the second bit allocation process assigned for the target classification may be configured to include a target classification bit area division step for dividing 4 bits (ID 4 to ID 7) allocated for the target classification into two or more areas having a predetermined range and a target assignment step for assigning a target corresponding to each of two or more areas having a predetermined range divided in the target classification bit area division step.

More specifically, the target assigned in the target assignment step may indicate a target corresponding to information included in the transmitted data.

Meanwhile, in the third bit allocation process for allocation for data number classification, each CAN ID generated as a bit allocated for the use classification and as a bit allocated for the target classification may transmit a maximum of 16 data.

Advantageous Effects

By using a standardized communication protocol in CAN communication, the present invention can reduce the inconvenience of setting the CAN communication protocol for each battery and power management system.

In addition, the present invention can perform CAN communication using the existing CAN communication protocol even if the number of batteries is expanded by standardizing the CAN communication protocol.

BEST MODE FOR CARRYING OUT THE INVENTION

Hereinafter, embodiments of the present invention will be described in detail with reference to the accompanying drawings so that those skilled in the art can easily carry out the present invention. The present invention may, however, be embodied in different forms and should not be construed as limited to the embodiments set forth herein. Parts not relating to description are omitted in the drawings in order to clearly describe the present invention and like reference numerals refer to like elements throughout.

Although the terms "first," "second," etc., may be used herein to describe various elements, these elements should not be limited by these terms. The above terms are used only to distinguish one component from another. For example, a first component may be referred to as a second component and vice versa without departing from the scope of the present invention. Terms used in this specification are used to describe specific embodiments, and are not intended to limit the scope of the present invention. The singular expressions include plural expressions unless the context clearly dictates otherwise.

Throughout the specification, when a portion is referred to as being "connected" to another portion, it includes not only "directly connected" but also "electrically connected" with another element therebetween. Furthermore, when it is described that one comprises (or includes or has) some elements, it should be understood that it may comprise (or include or has) only those elements, or it may comprise (or include or have) other elements as well as those elements if there is no specific limitation. The term "~ing operation" or "operation of ~ing" used throughout the specification does not mean "operation for ~ing".

Terms used in this specification may be currently widely used general terms in consideration of functions in the present invention but may vary according to the intents of those skilled in the art, precedents, or the advent of new technology. Additionally, in certain cases, there may be terms the applicant selects arbitrarily and in this case, their meanings are described in a corresponding description part of the present invention. Accordingly, terms used in the present invention should be defined based on the meaning of the term and the entire contents of the present invention instead of the simple term name.

1. CAN Communication Method According to Embodiment of Present Invention

In performing CAN communication using a CAN ID represented by a predetermined bit, the CAN communication method according to an embodiment of the present invention may generate the CAN ID represented by the predetermined bit by including a first bit allocation process S100 for allocating N-th to M-th bits of the CAN ID for use classification, a second bit allocation process S200 for allocating O-th to P-th bits of the CAN ID for target classification, and a third bit allocation process S300 for allocating the Q-th to R-th bits of the CAN ID for data number classification.

In this case, the N, M, O, P, Q, and R can satisfy the relationship of R>Q, P>O, M>N, N>P, O>R.

Figure 3:
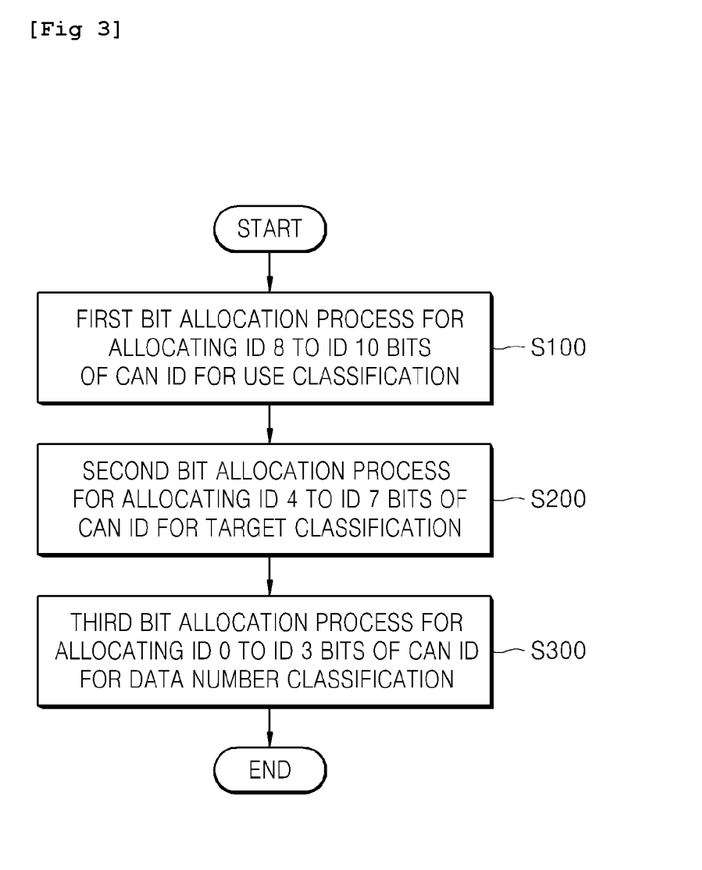
FIG. 3 is a flowchart illustrating a sequence of a CAN communication method according to an embodiment of the present invention.

FIG. 3 is a flowchart illustrating an overall flow of a CAN communication method according to an embodiment of the present invention.

Hereinafter, the CAN ID represented by 11 bits used in standard CAN communication will be described with reference to FIG. 3.

Figure 2:
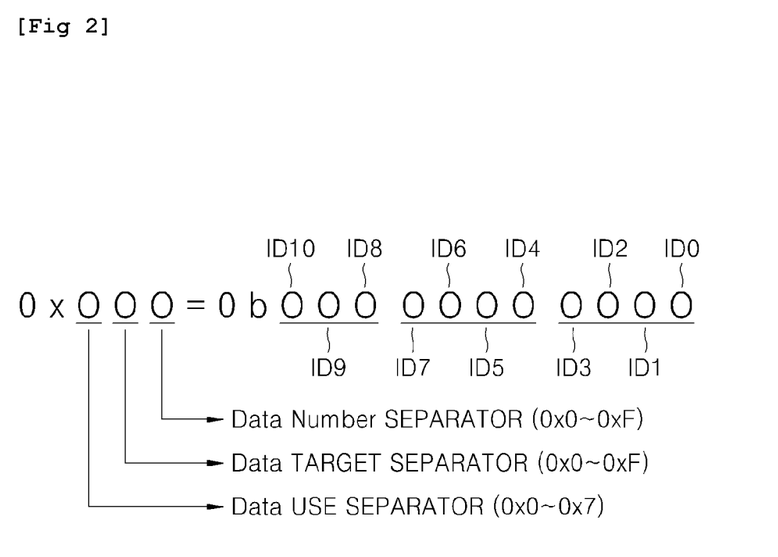
FIG. 2 is a view illustrating a structure of a CAN ID according to an embodiment of the present invention.

In other words, the CAN ID represented by 11 bits ID 0 to ID 10 used in standard CAN communication may be generated through a first bit allocation process S100 for allocating ID 8 to ID 10 bits of the CAN ID for use classification, a second bit allocation process S200 for allocating ID 4 to ID 7 bits of the CAN ID for target classification, and a third bit allocation process S300 for allocating ID 0 to ID 3 bits of the CAN ID for data number classification, as illustrated in FIG. 2.

Meanwhile, in an embodiment of the present invention, only CAN communication (e.g., standard CAN communication) represented by 11 bits is described, but the present invention can be used not only for standard CAN communication but also for extension CAN communication (represented by 29 bits) represented by bits according to other than 11 bits.

Figure 4:
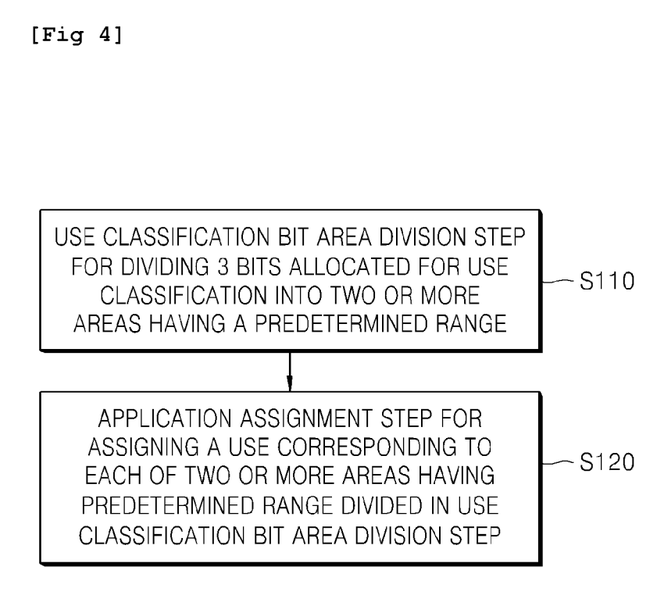
FIGS. 4 and 5 are flowcharts illustrating a CAN communication method according to an embodiment of the present invention.

As illustrated in FIG. 4, the first bit allocation process S100 may be configured to include a use classification bit area division step S110 for dividing 3 bits (ID 8 to ID 10 bits of the CAN ID) allocated for use classification into two or more areas having a predetermined range and an application assignment step S120 for assigning a use corresponding to each of two or more areas having a predetermined range divided in the use classification bit area division step.

On the other hand, the use assigned in the application assignment step S120 may be assigned according to the data transmission frequency or may be assigned according to the area where data is transmitted and received.

For example, the use assigned according to the transmission frequency may be set to one or more of periodic use, which is a use to transmit periodic data, and one-time use, which is a use to transmit one-time data.

The use assigned according to the area in which the data is transmitted and received may be set as an external data communication use transmitted or received by the battery system and the power management device or an internal data communication use transmitted or received within the battery system.

Meanwhile, the data to be transmitted in the periodic data transmission use may include at least one of general data of the power management device, general data of the battery system, and general data of individual batteries, and the data to be transmitted in the one-time-use data transmission use may include at least one of interruption data for interrupting the operation of the battery, mode change data for changing the mode of the battery, battery information data including at least one of temperature, voltage, and current of the battery cell, balancing data between battery cells, version or type data of individual batteries, and version or type data of the battery system.

Meanwhile, the use assigned according to the data transmission/reception area in the application assignment step S120 may be set as a data communication use transmitted/received between the battery system and the power management device or a data communication use transmitted/received in the battery system.

Figure 5:
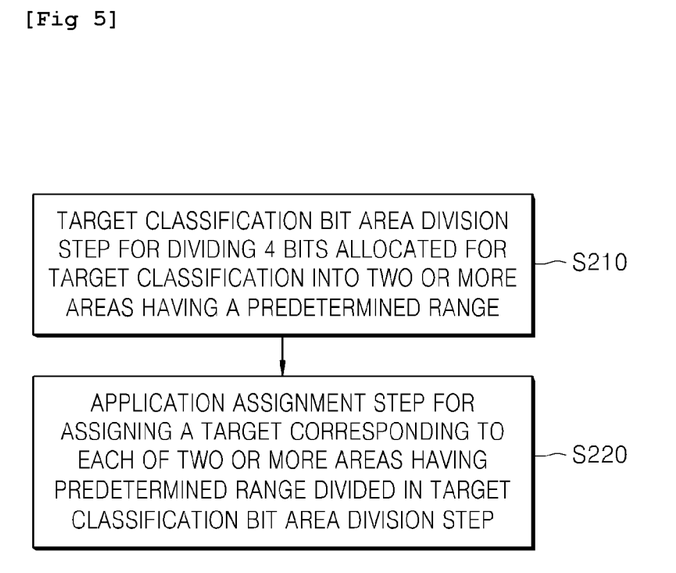

As illustrated in FIG. 5, the second bit allocation process S200 may be configured to include a target classification bit area division step S210 for dividing 4 bits (ID 4 to ID 7 bits of the CAN ID) allocated for the target classification into two or more areas having a predetermined range and a target assignment step S220 for assigning a target corresponding to each of two or more areas having a predetermined range divided in the target classification bit area division step.

More specifically, the target assigned in the target assignment step S220 may indicate a target corresponding to information included in the transmitted data.

For example, when the information of the individual unit batteries is transmitted from the master battery to the power management system at once, the power management system may divide the target assigned in the target assignment step to identify which unit battery the data is for.

Meanwhile, in the third bit allocation process S300 for allocation for data number classification, each CAN ID generated as a bit allocated for the use classification and as a bit allocated for the target classification can transmit a maximum of 16 data.

Meanwhile, hereinafter, the above-described steps and each process will be described with reference to actual data.

FIG. 2 is a diagram showing an 11-bit CAN communication ID used in CAN communication.

Referring to FIG. 2, the standard CAN ID used in CAN communication can be represented in the form of (0b 000 0000 0000). (0b indicates a binary number, and the CAN communication ID of the binary method can be represented by 11 bits (ID 0 to ID 10).)

On the other hand, if the 11-bit CAN ID is represented by a hexadecimal number, it can be represented by (0x0 0). At this time, 0x is a hexadecimal number.

Therefore, the 11-bit CAN ID can be represented in hexadecimal notation of the (0x000) form.

The 11-bit CAN communication ID is expressed in hexadecimal notation to improve the readability of the contents.

Table 1 is a table in which ID 8 to ID 10 bits (first bit in hexadecimal) of a CAN ID having an 11-bit size are allocated for use.

Table 2 is a table in which ID 4 to ID 7 bits (second bit in hexadecimal) of a CAN ID having an 11-bit size are allocated for target.

TABLE 1

| CAN ID Range | Cycle Type | Data Area | Department |
|---|---|---|---|
| 0x0 01 ~ 0x0FF | Reserved | | Reserved |
| 0x1 00 ~ 0x1FF | Reserved | | Reserved |
| 0x2 00 ~ 0x2FF | Periodic/ Event | PCS ↔ Battery System | PCS & Battery Master Data |
| 0x3 00 ~ 0x3FF | Event | PCS ↔ Battery System | Battery Unit Data |
| 0x4 00 ~ 0x4FF | Periodic | PCS ↔ Battery System | Battery Unit Data |
| 0x5 00 ~ 0x5FF | Periodic/ Event | Battery Internal | Battery Master ↔ Battery Unit |
| 0x6 00 ~ 0x6FF | Reserved | | Reserved |
| 0x7 00 ~ 0x7EF | Event | Battery Internal | LGC Internal (FBL, EOL, etc) |

TABLE 2

| CAN ID Range | Direction | Information |
|---|---|---|
| 0x200 ~ 0x20F | PCS → Battery | Event Request |
| 0x210 ~ 0x29F | PCS → Battery | Periodic PCS Data |
| 0x2A0 ~ 0x2FF | Battery → PCS | Periodic Master Data |
| 0x300 ~ 0x30F 0x400 ~ 0x40F | Battery →PCS | Event/Periodic Unit(0) Data |
| 0x310 ~ 0x31F 0x410 ~ 0x41F | Battery → PCS | Event/Periodic Unit(1) Data |
| ⊚ ⊚ | Battery → PCS | ⊚ ⊚ |
| 0x3F0 ~ 0x3FF 0x4F0 ~ 0x4FF | Battery → PCS | Event/Periodic Unit(15) Data |

Referring to Table 1, the range from 0x001 to 0x7EF is divided into a total of 8 ranges. First, the CAN ID in the range of 0x200 to 0x2FF can be allocated to be used in a communication protocol that transmits data periodically or one-time between the power management device and the master battery system.

Moreover, the CAN ID in the range of 0x300 to 0x3FF can be allocated to be used in a communication protocol that transmits data one-time between the power management device and the individual battery system.

Moreover, the CAN ID in the range of 0x400 to 0x4FF can be allocated to be used in a communication protocol that transmits data periodically between the power management device and the individual battery system.

Moreover, the CAN ID in the range of 0x500 to 0xSFF can be allocated to be used in a communication protocol that transmits data periodically or one-time between the master battery system and the individual battery system.

On the other hand, the CAN ID in the range of 0x700 to 0x7EF, as a battery developer range, can be used for production lines or updates of batteries, and may be allocated to be used in a communication protocol for transmitting one-time data in a battery in response to a customer.

On the other hand, the CAN ID within the range of 0x001 to 0x1FF and the CAN ID within the range of 0x600 to 0x6FF can be left as the free allocation space.

Meanwhile, referring to Table 2 above, Table 2 can be divided into predetermined areas depending on a subject to which data is transmitted again in each range divided into eight in Table 1 above.

In other words, the CAN ID in the range of 0x200 to 0x2FF is allocated to be used in a communication protocol for transmitting data periodically or one-time between the power management device and the master battery system, and by further subdividing this range, a range of 0x200-0x20F can be allocated to be used in a communication protocol for transmitting a one-time request signal from the power management device to the master battery system.

Meanwhile, the range of 0x210 to 0x29F can be allocated to be used in a communication protocol for periodically transmitting data signals of the power management device from the power management device to the master battery system.

Meanwhile, the range of 0x2A0 to 0x2FF can be allocated to be used in a communication protocol for periodically transmitting data signals of the master battery system from the master battery system to the power management device.

On the other hand, the range of 0x300 to 0x3FF is divided into 16 areas having the same range, and each of the areas may be allocated to be used in a communication protocol for transmitting data signals of each of individual battery systems at one time from an individual battery system allocated to each of the areas to a power management device.

On the other hand, the range of 0x400 to 0x4FF is divided into 16 areas having the same range, and each of the areas may be allocated to be used in a communication protocol for transmitting data signals of each of individual battery systems periodically from an individual battery system allocated to each of the areas or a master battery to a power management device.

In summary, a CAN communication ID with 11-bit size can set 8 kinds of use delimiters in total, and each of the use delimiters includes 16 target delimiters, and 16 data can be transmitted for each of the target delimiters.

Therefore, since the CAN ID used in CAN communication is allocated by each range, it may solve a difficult part of systematic management when CAN communication is established conventionally and thus CAN IDs are issued randomly.

In other words, when a new battery is added to the battery system in the conventional battery system and power management system, a new CAN ID is randomly assigned to the newly added battery, and it is troublesome to set the communication protocol directly in the power management device in order to recognize this in the power management system, but in the case of using the standardized CAN communication protocol described above, since the already-allocated CAN IDs are used, there is no need to set up power management device separately.

On the other hand, although the technical idea of the present invention is specifically described with reference to the above embodiments, it should be noted that the above embodiments are for the purpose of explanation and not for the purpose of limitation. It will be apparent to those skilled in the art that various modifications and variations can be made in the present invention without departing from the spirit and scope of the invention.

The invention claimed is:

1. A CAN communication method using a CAN ID represented by a predetermined bit, comprising:
    generating the CAN ID represented by the predetermined bit, wherein the generating includes:
    a first bit allocation process of allocating N-th to M-th bits of the CAN ID for use classification;
    a second bit allocation process of allocating O-th to P-th bits of the CAN ID for target classification; and
    a third bit allocation process of allocating Q-th to R-th bits of the CAN ID for data number classification,
    wherein N, M, O, P, Q and R are integers and satisfy a relation of R>Q, P>O, M>N, N>P, O>R; and
    performing CAN communication between a power management device and a master battery system in a first CAN ID range, between the power management device and an individual battery system in a second CAN ID range, or between the master battery system and the individual battery system in a third CAN ID range, and
    wherein each of the first CAN ID range, the second CAN ID range and the third CAN ID range is different from one another.

2. The CAN communication method of claim 1, wherein the first bit allocation process comprises:
    a use classification bit area division step of dividing the bits allocated for the use classification (N-th to M-th of the CAN ID) into two or more areas having a predetermined range; and
    an application assignment step of assigning a use corresponding to each of the two or more areas having the predetermined range divided in the use classification bit area division step.

3. The CAN communication method of claim 2, wherein the use assigned in the application assignment step is assigned according to a transmission frequency, or according to an area where data is transmitted and received.

4. The CAN communication method of claim 3, wherein the use assigned according to the transmission frequency is set as at least one of a periodic data transmission use and a one-time data transmission use, and
    wherein a use assigned according to a range of an area where data is transmitted and received is set as at least one of an external data communication use transmitted to and received from the master battery system and the power management device and an internal data communication use transmitted and received within the master battery system.

5. The CAN communication method of claim 4, wherein data transmitted in the periodic data transmission use comprises at least one of general data of the power management device, general data of the master battery system and general data of the individual battery system, and
    wherein data transmitted in the one-time data transmission use comprises at least one of interruption data for interrupting an operation of a battery of the individual battery system, mode change data for changing a mode of the battery, battery information data including at least one information of a temperature, a voltage, and a current of a battery cell of the battery among battery cells, balancing data between the battery cells of the battery, version or type data of the battery, and version or type data of the individual battery system.

6. The CAN communication method of claim 1, wherein the first bit allocation process comprises:
    a target classification bit area division step for dividing bits O-th to P-th allocated for the target classification into two or more areas having a predetermined range; and
    a target assignment step for assigning a data transmission target corresponding to each of two or more areas having the predetermined range divided in the target classification bit area division step.

7. The CAN communication method of claim 6, wherein the target assigned in the target assignment step represents a target corresponding to information included in transmitted data.

8. The CAN communication method of claim 1, wherein each CAN ID generated in the first bit allocation process and the second bit allocation process transmits up to $2^{(R-Q)}$ data.

9. A CAN communication method using a CAN ID represented by a predetermined bit, comprising:
    generating the CAN ID represented by the predetermined bit, wherein the generating includes:
    a first bit allocation process of allocating N-th to M-th bits of the CAN ID for use classification;
    a second bit allocation process of allocating O-th to P-th bits of the CAN ID for target classification; and
    a third bit allocation process of allocating Q-th to R-th bits of the CAN ID for data number classification,
    wherein N, M, O, P, Q and R are integers and satisfy a relation of R>Q, P>O, M>N, N>P, O>R, wherein the first bit allocation process comprises:
a use classification bit area division step of dividing the bits allocated for the use classification (N-th to M-th of the CAN ID) into two or more areas having a predetermined range; and
an application assignment step of assigning a use corresponding to each of the two or more areas having the predetermined range divided in the use classification bit area division step,
wherein the use assigned in the application assignment step is assigned according to a transmission frequency, or according to an area where data is transmitted and received,
wherein the use assigned according to the transmission frequency is set as at least one of a periodic data transmission use and an one-time data transmission use,
wherein a use assigned according to a range of an area where data is transmitted and received is set as at least one of an external data communication use transmitted to and received from a battery system and a power management device and an internal data communication use transmitted and received within a battery system,
wherein data transmitted in the periodic data transmission use comprises at least one of general data of a power management device, general data of a battery system and general data of an individual battery, and
wherein data transmitted in the one-time data transmission use comprises at least one of interruption data for interrupting an operation of a battery, mode change data for changing a mode of a battery, battery information data including at least one information of a temperature, a voltage, and a current of a battery cell, balancing data between battery cells, version or type data of an individual battery, and version or type data of a battery system.

10. A CAN communication method between an energy storage system (ESS) and a power management system using a CAN ID represented by a predetermined bit, comprising:
generating the CAN ID represented by the predetermined bit, wherein the generating includes:
a first bit allocation process of allocating N-th to M-th bits of the CAN ID for use classification;
a second bit allocation process of allocating O-th to P-th bits of the CAN ID for target classification; and
a third bit allocation process of allocating Q-th to R-th bits of the CAN ID for data number classification,
wherein N, M, O, P, Q and R are integers and satisfy a relation of R>Q, P>O, M>N, N>P, O>R; and
performing CAN communication between the ESS and the power management device using at least a first CAN ID range among a plurality of different CAN ID ranges.

* * * * *